United States Patent [19]

Lovegrove

[11] Patent Number: 4,793,957
[45] Date of Patent: Dec. 27, 1988

[54] APPARATUS FOR AND METHOD OF TREATING A VISCOUS MATERIAL

[75] Inventor: John G. A. Lovegrove, Oldham, England

[73] Assignee: Francis Shaw & Co. (Manchester) Ltd., Manchester, England

[21] Appl. No.: 18,533

[22] Filed: Feb. 25, 1987

[30] Foreign Application Priority Data

Feb. 25, 1986 [GB] United Kingdom ................ 8604673

[51] Int. Cl.⁴ .................... B29C 47/04; B29C 47/64
[52] U.S. Cl. .................... 264/171; 264/174; 264/211; 264/245; 264/349; 366/90; 366/99; 366/307; 425/113; 425/131.1; 425/205; 425/207
[58] Field of Search ............ 264/171, 174, 211, 245, 264/349; 425/113, 131.1, 205-208, 376 B; 366/90, 99, 307

[56] References Cited

U.S. PATENT DOCUMENTS

| | | | |
|---|---|---|---|
| 3,800,985 | 4/1974 | Grout et al. | 425/204 |
| 3,817,675 | 6/1974 | Maiocco | 425/207 |
| 4,182,601 | 1/1980 | Hill | 425/376 R |
| 4,336,213 | 6/1982 | Fox | 425/376 B |
| 4,338,274 | 7/1982 | Hill | 425/376 B |
| 4,419,014 | 12/1983 | Gale | 425/202 |
| 4,501,498 | 2/1985 | McKelvey | 425/204 |
| 4,595,546 | 6/1986 | Wheeler, Jr. | 425/206 |
| 4,642,040 | 2/1987 | Fox | 425/204 |

FOREIGN PATENT DOCUMENTS

| | | | |
|---|---|---|---|
| 4224061 | 9/1963 | Japan | 264/174 |
| 56-46977 | 11/1981 | Japan | 425/204 |
| 58-53431 | 4/1983 | Japan | 425/205 |
| 60-172110 | 9/1985 | Japan | 425/113 |

Primary Examiner—Jeffery Thurlow
Attorney, Agent, or Firm—Fleit, Jacobson, Cohn & Price

[57] ABSTRACT

Material to be colored is fed from an extruder to a positive displacement means such as a gear pump. The output from which is split into at least two streams one of which is fed to a mixer which is preferably a cavity transfer mixer. Colorant is injected into one of the streams either before or at the mixer and the two streams are recombined downstream of the mixer preferably in a diehead. The arrangement provides for reliable coloration whilst permitting flexibility in production.

22 Claims, 4 Drawing Sheets

APPARATUS FOR AND METHOD OF TREATING A VISCOUS MATERIAL

The present invention relates to apparatus for treating a viscous material such as plastics or rubber.

One form of treatment envisaged is colouration. In many forming processes polymeric materials such as plastics compounds and rubber compounds are fed to a machine such as an extruder which melts the feed material and forces it through an extrusion die to produce an elongate product. Although the final product may need to be coloured, there are many advantages in using a feed material which does not have the necessary colouring agents incorporated, then to add those colouring agents before material is passed to the extrusion die. One potential advantage to be gained is rapid changing from one colour to another. A second potential advantage is the possibility of colouring only the surface or specific regions of the extrucate. A third potential advantage is the possibility of producing a plurality of extrudates from a single source of melted polymer, with different colouration on the extrudates. These features can result in improved production efficiency, a reduction in manufacturing cost and the possibility of using new manufacturing techniques.

The colouring agents normally used are solid pigments with small particle size and a convenient method of adding these is to form a dispersion of the solid in a carrier fluid which is compatible with the polymeric material being processed. The liquid dispersion and base polymeric compound can then be pumped into a suitable device which normally performs some mixing to effect colouration of the base polymeric compound, the carrier fluid becoming incorporated in the base polymer.

Attempts have been made to effect colouration along these lines but unsatisfactory results are obtained unless adequate mixing of the colourant into at least part of the polymer melt stream is achieved. Typically problems can arise with an excess of the carrier fluid appearing on the outer surface making it too soft or sticky. Also a lack of distribution of colour can result in a streaky appearance on the extrudate. Furthermore local concentrations of colourant can result in poor mechanical properties and poor electrical properties in the case of insulation applied to an electrical cable.

The purpose of one embodiment of the invention is to provide a means whereby adequate mixing of added liquid colourant with the required section of the extrudate is achieved to overcome the problems which have been listed. A further feature of the embodiment is that the colourant addition system is applied in conjunction with a positive displacement means such as a gear pump which serves to assist in generating the extra pressure necessary to perform the colour mixing operation and to give improved uniformity in the cross section of the product. A positive displacement device applied to each of a plurality of extrusion streams fed from one source of molten polymer also enables the size of those extrusion streams to be made equal or kept in a chosen size relationship to each other. In this way the invention can be applied to production of multiple extrusions with different colouring or other additive features.

According to one aspect of the invention there is provided apparatus for treating a viscous material comprising a positive displacement material feed means, means for dividing material passing through the feed means into at least two component streams, a mixer for mixing a material modifying agent into one at least of the streams and means for recombining the streams.

According to another aspect of the invention, there is provided a method of modifying a viscous material including the steps of feeding the material to a positive displacement feed means, splitting the material flow into at least two streams, mixing a modifying agent into one at least of the streams and subsequently recombining the streams to produce a composite material comprising adjacent modified and unmodified regions.

In a preferred embodiment of the invention, the positive displacement means may comprise a gear pump. The means may be fed from an extruder. The means for dividing may comprise a forked passage, the dimensions of the branches of which are chosen to afford the desired flows in the two component streams. Where one stream is subject to greater resistance than the other a restriction may be incorporated in the branch with low resistance to promote flow down the high resistance branch. The mixer may be a cavity transfer mixer (one such mixer is described in European Pat. No. 004850) and the modifying agent a colourant. Alternatively other static or dynamic mixers which satisfactorily mix colour into the polymeric compound may be used. The means for recombining may be a multi-layer diehead, and this may function to maintain the material which is modified wholly externally of the unmodified material. For example, the modified material may wholly surround the unmodified material or the modified material may lie on or in the surface of the material in stripes or other discrete areas. The means for dividing may comprise partitioning between adjacent parts of the same feed means or between different adjacent feed means.

Alternatively the modified and unmodified melt streams may be recombined in a particular manner before entering the die head so that their flow through the die brings the steams into the desired configuration at the exit.

A single extruder may feed a plurality of feed means each of which is associated with respective means for dividing, mixing and recombining means. A single feed means may supply more than one mixer, in which case means are provided for dividing the flow to provided the appropriate additional number of component streams.

The modifying agent is advantageously introduced into the appropriate stream between the material feed means and the mixer. In the case of a colourant, introduction is by way of a colourant injector. Where the means for recombining form a wire insulation forming diehead, this permits insulation to be formed in two concentric annular layers, the inner one being unmodified and the outer one being modified.

In order that the invention may be more clearly understood, two embodiments thereof will now be described by way of example, with reference to the accompanying drawing, in which.

Figure 1:
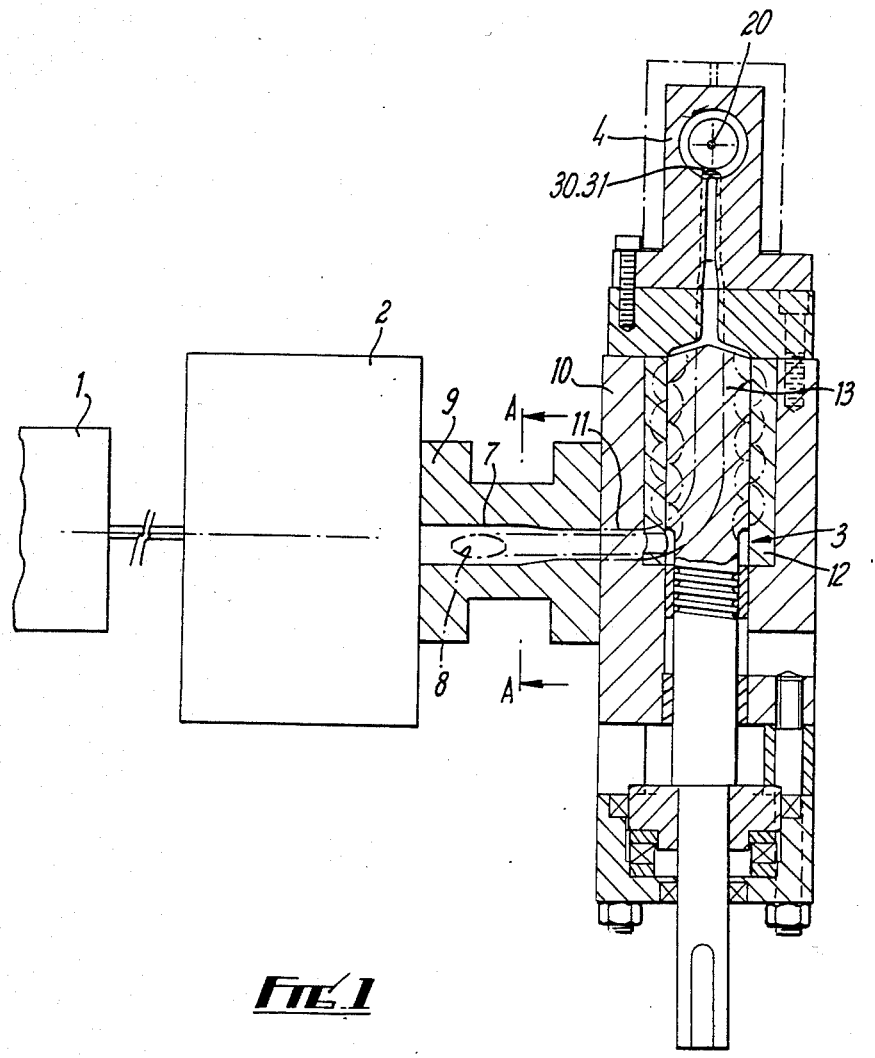
FIG. 1 shows a side elevation of an installation.
Figure 2:
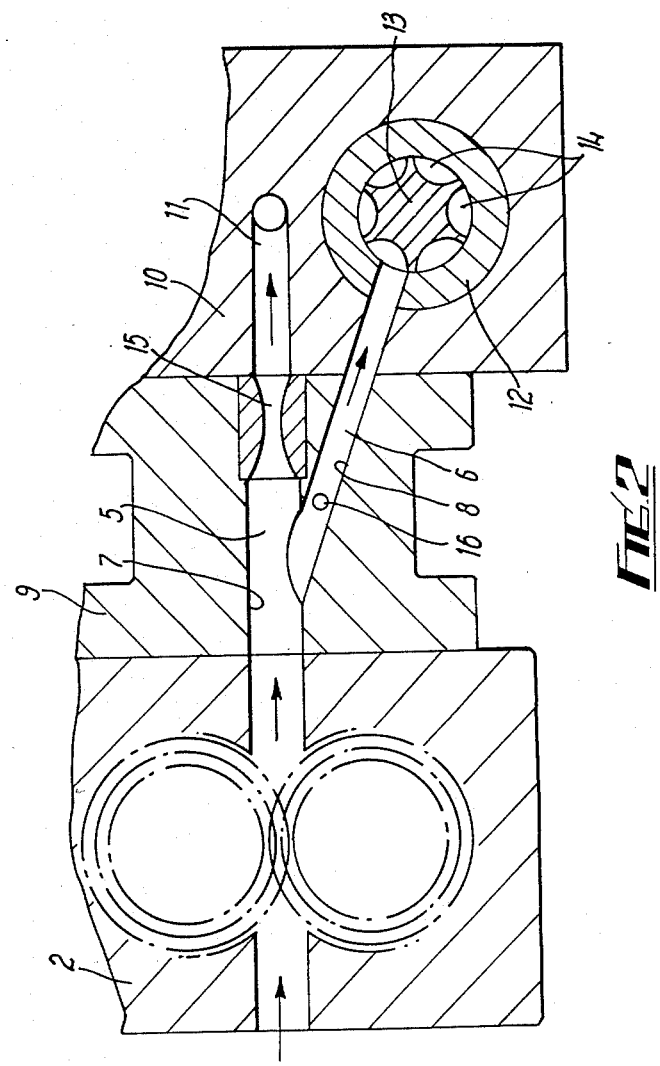
FIG. 2 shows a partial cross sectional view of the installation of FIG. 1.
Figure 3:
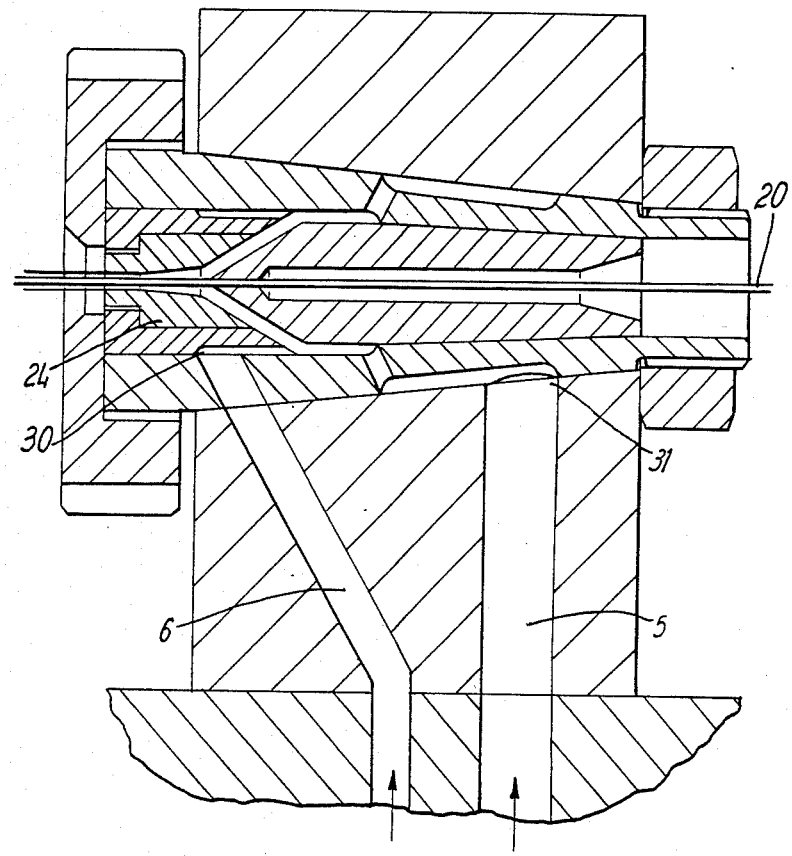
Figure 4:
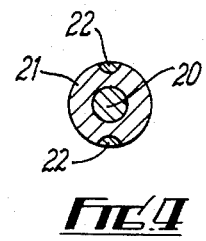
Figure 5:
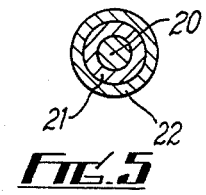
Figure 6:
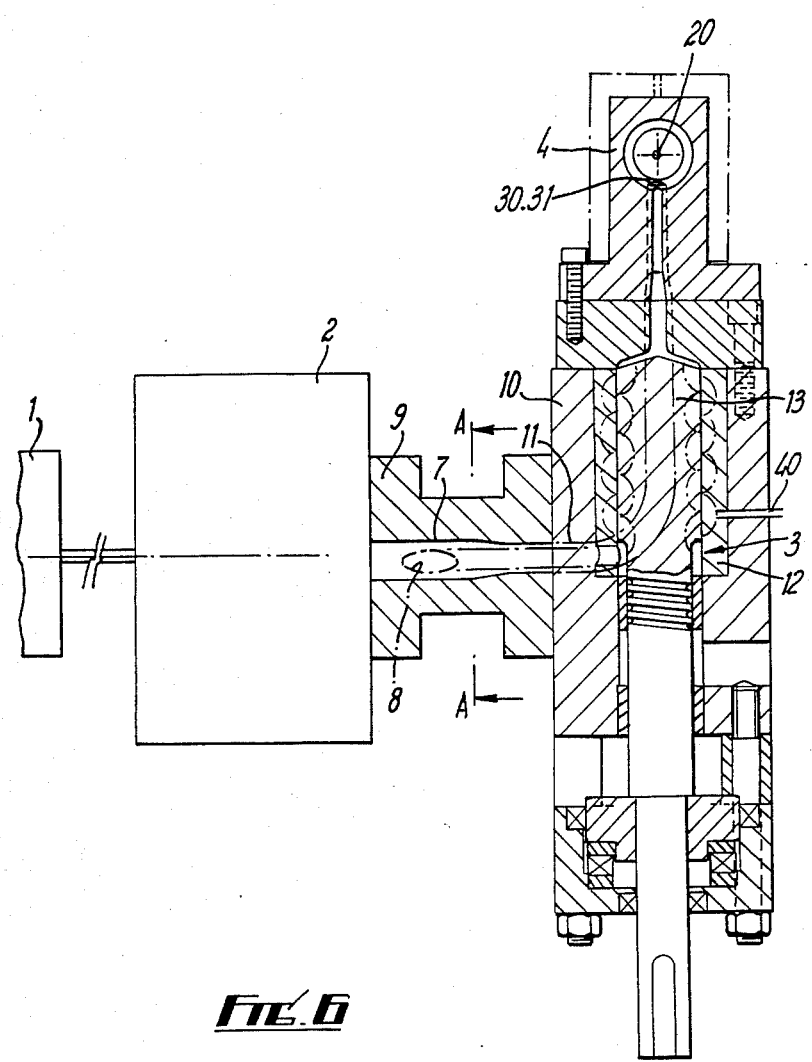

FIG. 3 is a cross sectional view through the diehead forming part of the installation of FIG. 1, FIGS. 4 and 5 are cross-sectional views of wires which may be formed using the apparatus of FIGS. 1 and 2, and FIG. 6 shows a side elevational view of an alternative installation to that of FIG. 1, Referring to FIGS. 1 to 5 of the drawings, the installation comprises an extruder 1, a gear pump 2, a cavity transfer mixer 3 and a diehead 4. The extruder 1 supplies rubber or plastics material to the gear pump 2 which, as it is a positive displacement device, acts to meter flow of material through the installation. Downstream of the gear pump 2, the outflow from gear pump 2 is split into two branch flows 5 and 6 confined within two channels 7 and 8 defined by a block 9 disposed between the pump 2 and a further block 10. This further block houses the cavity transfer mixer 3 and defines a passage 11 forming an extension of the channel 7. Passage 8 leads through the block 10 and the stator 12 of the cavity transfer mixer to communicate with the recesses 14 in the rotor 13 of the mixer.

To promote flow through the smaller cross section passage 8, if necessary a constriction 15 is formed in the larger cross section passage 7. Colourant or other modifying agent is injected into the material flowing through the passage 7 by means of a colourant injector 16 which extends into the passage. This colourant is throughly mixed with the material in the mixer 3 and the coloured material exits from the mixer to the diehead 4. Meanwhile uncoloured or unmodified material passes through the passage 11 directly to the diehead 4.

In FIG. 1, the diehead 4 is shown in cross-section, the conductor wire 20 to be coated passing perpendicularly into or out of the plane of the paper. Referring additionally to FIG. 3, the flows of coloured and uncoloured material 6 and 5 are introduced into the diehead (which comprises a die 24) at different points respectively referenced 30 and 31. The uncoloured material is formed around the wire (referenced 20) first and the coloured material is formed around the uncoloured material. The resultant cross section through the wire is shown in FIG. 5, the uncoloured material 21 and the coloured material 22. If desired different effects may be produced. For example, a striped effect of coloured and uncoloured material could be produced by having the coloured material extend through discrete regions of the uncoloured base material. A cross section through this arrangement is shown in FIG. 4.

The above described embodiment enables a coloured insulated wire to be produced economically and with good insulation properties. Furthermore, as less colourant resides in the system than with previous colouration installations faster colour changes are permitted.

Although in the embodiment described above, colourant is introduced into the channel 7 leading to the mixer, for practical reasons, it may be more appropriate to introduce the colourant through the stator 12 of the mixer itself. Such an arrangement is shown in FIG. 6 of the drawings where the colourant injector is referenced 40. This arrangement may result in reduced colourant loss through seals of the mixer.

It will be appreciated that the above embodiment has been described by way of example only and that many variations are possible without departing from the scope of the invention. For example, several lines comprising a pump, mixer and diehead can be fed from a single extruder system permitting independent colouration of a plurality of wires simultaneously. Furthermore, a single gearpump can feed more than one mixer in which case a single wire can be coloured with two or more different colours. Also the flow of material from the extruder may be split at the pump itself either by having differing gearpumps side by side but partitioned from each other or by having an internal partition in a gearpump. In the case of differing gear pumps or a partitioned gear pump a fixed proportion of the melt stream is forced to flow through the mixing device. Furthermore in such a system the colourant or other additive may be injected at or before the inlet to the appropriate gear pump or gear pump section so reducing the maximum pressure demanded from the additive pump.

I claim:

1. Apparatus for treating a viscous material comprising a positive displacement material feed means, means for dividing material passing from the feed means into at least two component streams, a cavity transfer mixer for mixing a material modifying agent into at least one of the streams and means for recombining the streams.

2. Apparatus as claimed in claim 1, in which the positive displacement feed means comprises a gear pump.

3. Apparatus as claimed in claim 1, in which the positive displacement feed means is fed from an extruder.

4. Apparatus as claimed in claim 1, in which the means for dividing comprises a forked passage, the dimensions of the branches of which are chosen to afford the desired flows in the corresponding component streams.

5. Apparatus as claimed in claim 1, in which means are provided for introducing modifying agent to one of the streams before the mixer.

6. Apparatus as claimed in claim 1, in which means are provided for introducing modifying agent to one of the streams at the mixer.

7. Apparatus as claimed in claim 1, in which a restriction is provided in the passage for one component stream to promote flow in the or each other component stream.

8. Apparatus as claimed in claim 1, in which the means for recombining is a multi-layer diehead.

9. Apparatus as claimed in claim 1, in which the means for recombining functions to maintain the material which is modified wholly externally of the unmodified material.

10. Apparatus as claimed in claim 1, in which the means for dividing comprises partitioning between adjacent parts of the same feed means.

11. Apparatus as claimed in claim 1, in which the means for dividing comprises partitioning between different adjacent feed means.

12. Apparatus as claimed in claim 1, in which a plurality of feed means is from a single extruder and each feed means is associated with respective means for dividing, mixing and recombining.

13. Apparatus as claimed in claim 1, in which the feed means feed more than one mixer, the means for dividing being operative to provide a corresponding number of additional component streams.

14. A method of modifying a viscous material including the steps of feeding the material to a positive displacement feed means, splitting the material flow into at least two streams, mixing a modifying agent into one at least of the streams by means of a cavity transfer mixer and subsequently recombining the streams to produce a composite material comprising adjacent modified and unmodified regions.

15. A method as claimed in claim 14, in which the modifying agent is a colourant.

16. A method as claimed in claim 15, in which the colourant is injected by means of a colourant injector.

17. A method as claimed in claim 14, in which the modified and unmodified streams are recombined prior to passage through a diehead in a desired manner so that the recombined streams energe from the diehead in a related desired configuration.

18. A method as claimed in claim 14, in which the material is recombined in a diehead to produce two concentric layers one being modified and the other not.

19. A method as claimed in claim 14, in which material is fed from a single extruder to a plurality of positive displacement feed means.

20. A method as claimed in claim 14, in which a single positive displacement feed means supplies more than one mixer.

21. A method as claimed in claim 14, in which modifying agent is introduced into one of the streams before the mixer.

22. A method as claimed in claim 14, in which modifying agent is introduced into one of the streams at the mixer.

* * * * *

UNITED STATES PATENT AND TRADEMARK OFFICE
CERTIFICATE OF CORRECTION

PATENT NO.    : 4,793,957
DATED         : December 27, 1988
INVENTOR(S)   : John G. A. Lovegrove It is certified that error appears in the above-identified patent and that said Letters Patent is hereby corrected as shown below:

On the title page, under FOREIGN PATENT DOCUMENTS,

"58-53431" should be --58-63431--.

Signed and Sealed this

Twenty-sixth Day of December, 1989

*Attest:*

JEFFREY M. SAMUELS

*Attesting Officer*   *Acting Commissioner of Patents and Trademarks*